(12) United States Patent
Swaine

(10) Patent No.: US 11,204,879 B2
(45) Date of Patent: Dec. 21, 2021

(54) MEMORY MANAGEMENT CIRCUITRY MANAGING DATA TRANSACTIONS AND ADDRESS TRANSLATIONS BETWEEN AN UPSTREAM DEVICE AND A DOWNSTREAM DEVICE

(71) Applicant: Arm Limited, Cambridge (GB)

(72) Inventor: Andrew Brookfield Swaine, Sheffield (GB)

(73) Assignee: Arm Limited, Cambridge (GB)

( * ) Notice: Subject to any disclaimer, the term of this patent is extended or adjusted under 35 U.S.C. 154(b) by 83 days.

(21) Appl. No.: 16/433,311

(22) Filed: Jun. 6, 2019

(65) Prior Publication Data

US 2020/0387457 A1 Dec. 10, 2020

(51) Int. Cl.
*G06F 12/00* (2006.01)
*G06F 12/1009* (2016.01)
*G06F 13/42* (2006.01)

(52) U.S. Cl.
CPC ...... *G06F 12/1009* (2013.01); *G06F 13/4221* (2013.01)

(58) Field of Classification Search
CPC .......................... G06F 12/1009; G06F 13/4221
See application file for complete search history.

(56) References Cited

U.S. PATENT DOCUMENTS

| 8,762,609 B1* | 6/2014 | Lam | G06F 15/8007 |
| | | | 710/74 |
| 9,965,417 B1* | 5/2018 | Azad | G06F 12/1081 |
| 2007/0283115 A1* | 12/2007 | Freeman | G06F 21/6227 |
| | | | 711/163 |
| 2007/0283125 A1* | 12/2007 | Manczak | G06F 11/3466 |
| | | | 711/207 |
| 2011/0004739 A1* | 1/2011 | Hohmuth | G06F 12/1027 |
| | | | 711/207 |
| 2012/0242671 A1* | 9/2012 | Wyatt | G09G 5/001 |
| | | | 345/520 |

(Continued)

*Primary Examiner* — Prasith Thammavong
(74) *Attorney, Agent, or Firm* — Nixon & Vanderhye P.C.

(57) ABSTRACT

Circuitry comprises a transaction interface to receive a data handling transaction from an upstream device, the data handling transaction defining a target virtual memory address in a virtual memory address space; translation circuitry to access a set of address mappings between virtual memory addresses and physical memory addresses in a physical memory address space; the translation circuitry being configured to initiate handling of the data handling transaction by a downstream device according to a target physical memory address mapped from the target virtual memory address when the set of address mappings includes an address mapping for the target virtual memory address, and to provide a transaction response to the transaction interface indicating a fault condition when the set of address mappings fails to provide an address mapping for the target virtual memory address; and control circuitry to receive a memory region request from the upstream device, requesting that a memory region in the virtual memory address space including the target virtual memory address be made available, to initiate handling of the memory region request and to provide a response to the upstream device in dependence upon the handling of the memory region request.

16 Claims, 5 Drawing Sheets

(56) References Cited

U.S. PATENT DOCUMENTS

| | | | |
|---|---|---|---|
| 2012/0278525 A1* | 11/2012 | Serebrin | G06F 11/1464 711/6 |
| 2012/0297146 A1* | 11/2012 | Guthrie | G06F 9/30076 711/141 |
| 2013/0227248 A1* | 8/2013 | Mehta | G06F 12/1027 711/207 |
| 2014/0380024 A1* | 12/2014 | Spadini | G06F 9/3836 712/217 |
| 2015/0026686 A1* | 1/2015 | Spadini | G06F 9/30043 718/102 |
| 2016/0124891 A1* | 5/2016 | Ahmad | G06F 13/1642 710/310 |
| 2016/0139810 A1* | 5/2016 | Preyssler | G06F 3/0673 711/154 |
| 2016/0149765 A1* | 5/2016 | Mittal | H04L 69/02 703/21 |
| 2016/0259732 A1* | 9/2016 | Mukherjee | G06F 9/45558 |
| 2016/0259734 A1* | 9/2016 | Mukherjee | G06F 12/0811 |
| 2019/0042482 A1* | 2/2019 | Katragada | G06F 12/0284 |
| 2019/0205263 A1* | 7/2019 | Fleming | G06F 12/0246 |

* cited by examiner

MEMORY MANAGEMENT CIRCUITRY MANAGING DATA TRANSACTIONS AND ADDRESS TRANSLATIONS BETWEEN AN UPSTREAM DEVICE AND A DOWNSTREAM DEVICE

BACKGROUND

This disclosure relates to circuitry and methods.

In some circuitry examples using memory address translation, it can be possible to configure translation for a device such that when a translation fault occurs, the faulting transaction is stalled so that the software such as an operating system can decide what to do with it. This resolution process can be automatically initiated by a memory management unit and can be invisible to the stalled device. The memory management unit can then wait until the transaction is retried or terminated.

Stall faults can however cause deadlock in some scenarios. As a result, general-purpose operating systems such as Linux are often not able to enable stall faulting in any devices, in case it causes deadlock.

Another system for handling such issues is the use of the ATS (Address Translation Services) and PRI (Page Request Interface) facilities of the PCIe (Peripheral Component Interconnect—express) protocol. Under ATS, memory address translations are obtained in advance of transaction issue and are buffered at a transaction-initiating device or endpoint. If a translation fault occurs in response to an ATS request, the endpoint is expected (but not required) to issue a PRI request. When the memory management unit receives a PRI request it notifies software such as an operating system. For example, if the fault is caused by a memory page having previously been swapped out, then the operating system can swap it in again in order that the transaction can proceed. The memory management unit notifies the endpoint when it receives a response from software, and the endpoint is expected (but not required) to retry the ATS request if the PRI request was successful.

Stalling and ATS are separately enabled features and cannot be enabled at the same time.

SUMMARY

In an example arrangement there is provided circuitry comprising a transaction interface to receive a data handling transaction from an upstream device, the data handling transaction defining a target virtual memory address in a virtual memory address space;

translation circuitry to access a set of address mappings between virtual memory addresses and physical memory addresses in a physical memory address space;

the translation circuitry being configured to initiate handling of the data handling transaction by a downstream device according to a target physical memory address mapped from the target virtual memory address when the set of address mappings includes an address mapping for the target virtual memory address, and to provide a transaction response to the transaction interface indicating a fault condition when the set of address mappings fails to provide an address mapping for the target virtual memory address; and control circuitry to receive a memory region request from the upstream device, requesting that a memory region in the virtual memory address space including the target virtual memory address be made available, to initiate handling of the memory region request and to provide a response to the upstream device in dependence upon the handling of the memory region request.

In another example arrangement there is provided circuitry comprising:

a transaction interface to communicate a data handling transaction to a downstream device, the data handling transaction defining a target virtual memory address in a virtual memory address space, and to receive a transaction response indicating either completion of the data handling transaction or a fault condition when translation of the target virtual memory address to a target physical memory address failed;

control circuitry to issue a memory region request to the downstream device, requesting that a memory region in the virtual memory address space including the target virtual memory address be made available, and to receive a memory region request response from the downstream device;

the control circuitry being configured to selectively reissue the data handling transaction in dependence upon the memory region request response received from the downstream device.

In another example arrangement there is provided a method comprising receiving a data handling transaction from an upstream device, the data handling transaction defining a target virtual memory address in a virtual memory address space;

accessing a set of address mappings between virtual memory addresses and physical memory addresses in a physical memory address space;

initiating handling of the data handling transaction by a downstream device according to a target physical memory address mapped from the target virtual memory address when the set of address mappings accessed by the accessing step includes an address mapping for the target virtual memory address;

providing a transaction response indicating a fault condition when the set of address mappings accessed by the accessing step fails to provide an address mapping for the target virtual memory address; and in response to receipt of a memory region request from the upstream device, requesting that a memory region in the virtual memory address space including the target virtual memory address be made available, initiating handling of the memory region request and providing a response in dependence upon the handling of the memory region request.

In another example arrangement there is provided a method comprising:

communicating a data handling transaction to a downstream device, the data handling transaction defining a target virtual memory address in a virtual memory address space;

receiving a transaction response indicating either completion of the data handling transaction or a fault condition when translation of the target virtual memory address to a target physical memory address failed;

issuing a memory region request to the downstream device, requesting that a memory region in the virtual memory address space including the target virtual memory address be made available;

receiving a memory region request response from the downstream device; and selectively reissuing the data handling transaction in dependence upon the memory region request response received from the downstream device.

Further respective aspects and features of the present disclosure are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
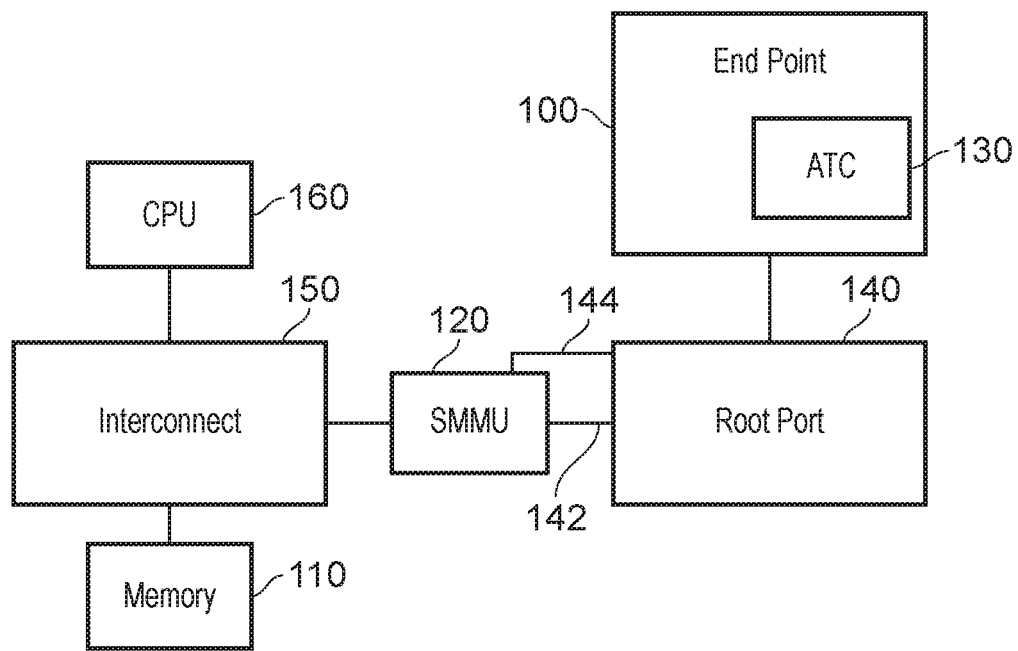
FIG. 1 schematically illustrates circuitry operating according to a so-called Peripheral Component Interconnect Express (PCIe) arrangement.

Referring now to the drawings, FIG. 1 schematically illustrates circuitry operating as a so-called Peripheral Component Interconnect Express (PCIe) arrangement. In the example of PCIe as drawn, a so-called endpoint 100 interacts with peripheral devices such as a memory 110, for example to read or write data from/to the memory 110. The endpoint operates according to virtual addresses (VA) whereas eventual interaction with the memory 110 takes place according to physical addresses (PA). Therefore, in order to execute a data handling transaction initiated by the endpoint 100, a VA must be translated into a PA.

Figure 5:
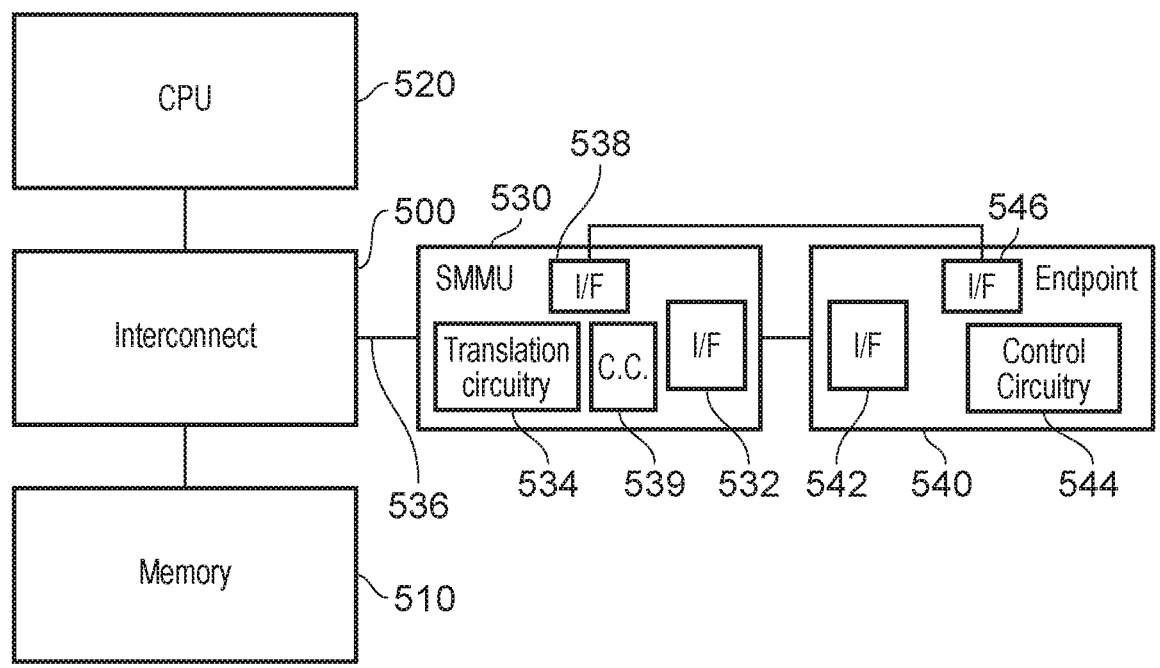
FIG. 5 schematically illustrates an example circuitry.

The PCIe functionality discussed here, whether in connection with the previously proposed PCIe circuitry of FIG. 1 or the example embodiment of FIG. 5 which makes use of some PCIe functionality, relates to the PCIe standard from generation 4.0 onwards (that is to say, and higher), as defined by standards published at https://pcisig.com/specifications, the contents of which are hereby incorporated by reference.

Figure 4:
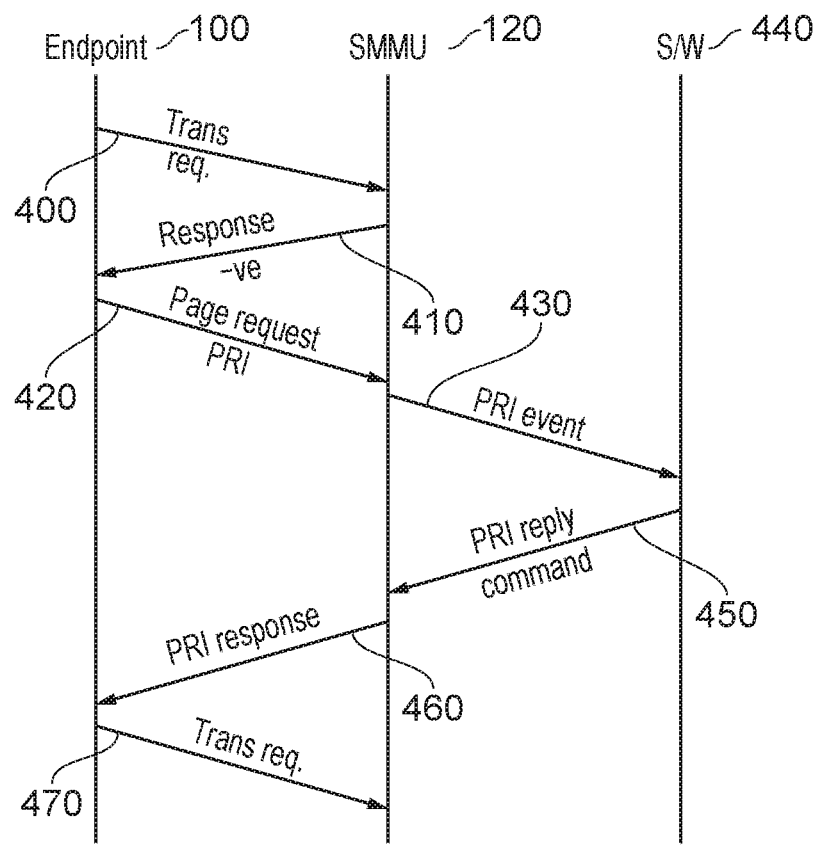

In the previously proposed arrangement of FIG. 1, this translation is handled at the endpoint 100 itself, in that before the endpoint 100 issues a data handling transaction dependent upon a VA, the endpoint 100 obtains the required address translation, for example from a memory management unit or system memory management unit (SMMU) 120, and stores the address translation in an address translation cache (ATC) 130. Note therefore that in the example of FIG. 1, it is assumed that ATS is enabled, PRI (as discussed later in connection with FIG. 4) is enabled, and stalling is therefore not enabled.

This operation, to pre-populate the ATC 130 with the required translation, is carried out (as a so-called "address translation service" (ATS) operation) before the data handling transaction is issued. This implies that a data handling transaction as issued by the endpoint 100 has its address already translated to the required PA using the information stored in the ATC 130.

As shown in FIG. 1, the endpoint 100 communicates with the SMMU 120 via a so-called root port 140 having a first interface 142 with the SMMU to carry data handling transactions themselves and a second interface 144 to carry ATS requests and also page requests (which will be discussed below). The SMMU 120 communicates with the memory 110, for example, via an interconnect 150 to which other devices such as a processing element or CPU 160 may be connected.

Figure 2:
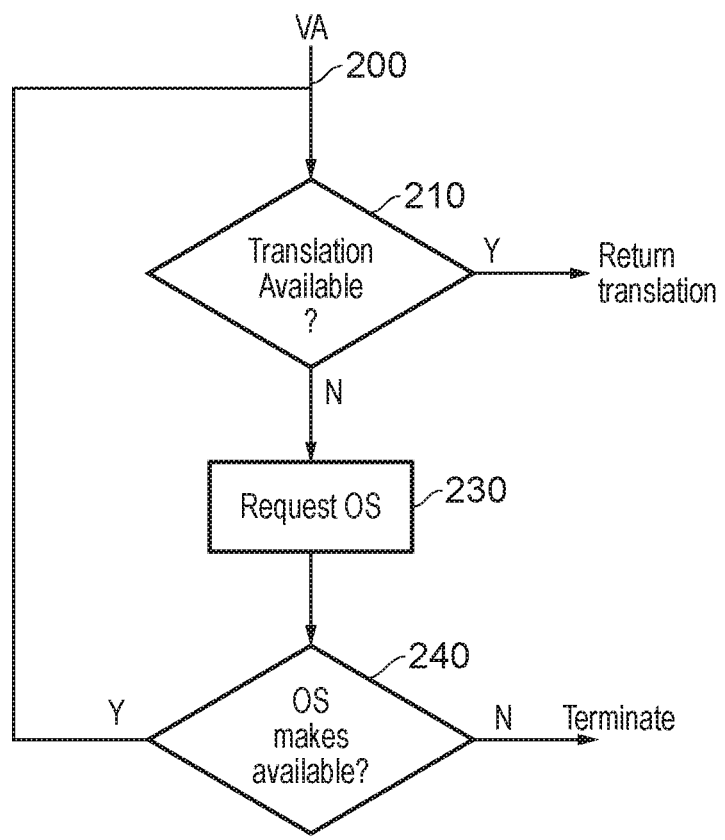
FIG. 2 is a schematic flowchart illustrating a method.

FIG. 2 schematically illustrates aspects of the operation of the circuitry of FIG. 1, in that in a VA 200 requires translation and, before a transaction is issued making use of that VA, the VA 200 is first provided as an ATS request from the endpoint 100 to the SMMU 120. If, at a step 210, the required address translation is available, it is returned to the endpoint 100 and stored in the ATC 130.

However, it may be the situation that the required translation is not available. For example, if there is a translation fault, then at a step 230 a so-called page request is made by the endpoint 100 using the interface 144 (which may be referred to as a Page Request Interface or PRI in this context). The page request is a request to software to make available the memory page or region containing the required VA. The software may be for example an operating system (OS) running on the CPU 160 and providing configuration to the memory system including the translation tables and supporting information of the SMMU 120. This process of "making available" may include for example populating translation information at the SMMU 120 and/or providing permission data to enable access to the required page.

If, at a step 240, the required page has been made available, then the translation request by the endpoint 100 can be retried such that control passes back to the step 210. If not, then the process terminates in a fault condition.

Figure 3:
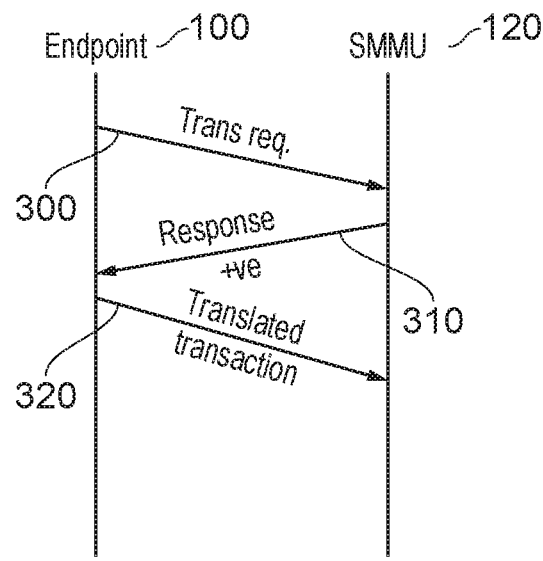
FIGS. 3 and 4 are schematic timing diagrams.

FIG. 3 is a schematic timing diagram illustrating the operation described above, in which, at a step stage 300 the endpoint 100 makes an ATS translation request to the SMMU 120. Assuming that the request can be serviced straight away, whether by looking up in a translation lookaside buffer (TLB) or by performing a process such as a page table walk (PTW) in memory, the SMMU 120 replies at a stage 310 with a response including the required translation which the endpoint 100 stores in the ATC 130.

The endpoint 100 can then issue, at a step 320, the relevant data handling translation with the VA already translated to a PA.

In FIG. 4, again a translation request is issued at a stage 400 but in this instance, the SMMU 120 is unable to service the translation request and provides a negative response 410. This negative response prompts the endpoint 100 to issue a page request 420 to the SMMU. The SMMU reacts by issuing a PRI "event" 430 to software 440 such as an operating system running on the CPU 160. In order to prompt the software 440 to deal with the PRI event, the SMMU may also issue an interrupt request associated with the PRI event 430 to the CPU 160.

The software 440 deals with the PRI event and provides a PRI reply command 450 to the SMMU 120, which instructs the SMMU 120 to issue a PRI response 460 to the endpoint 100. If this PRI response 460 is positive, indicating that the request to page has now been made available, (the "yes" outcome from the step 240 in FIG. 2) then the endpoint 100 can reissue the ATS translation request at a stage 470. If a negative response is provided as the PRI response 460 (the "no" outcome of the step 240) then the endpoint 100 can take other fault-handling action not shown in FIG. 4.

FIG. 5 is a schematic diagram illustrating examples of circuitry according to an embodiment of the present disclosure. In common with FIG. 1, an interconnect 500 is provided to which (in this example) a memory 510 and a CPU 520 are connected. Again, an SMMU 530 is connected to the interconnect 500. The CPU 520 may run an operating system having supervisory control over the SMMU 520 and address translation in the system. The circuitry of FIG. 5 may be implemented as an integrated circuit or chip.

An endpoint 540 may be, for example, a so-called "root complex integrated endpoint" (RCiEP) which may be, for example on-chip device which does not itself implement the PCIe protocol but can appear for programming purposes as a PCIe root complex, for example by advertising (notifying other devices) that it supports PRI and/or ATS.

In contrast to a PCIe endpoint such as that shown in FIG. 1, however, the endpoint 540 does not (or need not) contain a cache for address translations (corresponding to the ATC 130 in the previously proposed arrangement of FIG. 1). To avoid the need for cache invalidations to be provided to the endpoint 540 whenever a previously-used translation is invalidated, in example arrangements control circuitry 544 of the endpoint 540 may be configured to issue a notification to the downstream device that the circuitry does not comprise a translation cache memory.

The SMMU 530 comprises a transaction interface 532 to receive a data handling transaction from an upstream device such as the endpoint 540, the data handling transaction defining a target virtual memory address (VA) in a virtual memory address space and translation circuitry 534 to access a set of address mappings between VAs and PAs in a physical memory address space. For example, the translation circuitry 534 may include a local cache of translations such as a so-called translation lookaside buffer (TLB) and/or may access translation tables for example in the memory 510 by a so-called page table walk (PTW) process.

The translation circuitry 534 is configured to initiate handling of the data handling transaction by a downstream device such as the memory 510 according to a target PA mapped from the target VA when the set of address mappings (which the translation circuitry 534 can access) includes an address mapping for the target VA, and to provide a transaction response to the transaction interface indicating a fault condition when the set of address mappings fails to provide an address mapping for the target VA.

The endpoint 540 also includes a transaction interface 542 to communicate a data handling transaction to a downstream device such as the SMMU 530. As mentioned above, the data handling transaction defines a target VA. The endpoint 540 via the interface 542 also receives a transaction response indicating either completion of the data handling transaction or a fault condition when translation of the target VA has failed.

In the context of the circuitry shown in FIG. 5, the terms "upstream" and "downstream" refer to the logical connection of devices with respect to the issue of data handling transactions. So a data handling transaction is issued in a direction from upstream towards downstream, and a transaction response is provided back towards the upstream direction.

In contrast to the arrangement of FIG. 1, the endpoint 540 provides untranslated transactions to the SMMU 530. it is the SMMU 520 which performs the translation and forwards the transaction via an interface 536 to the interconnect 500 for handling, for example by the memory 510. Also in contrast to the PCIe arrangement of FIG. 1, a transaction response is also provided to the endpoint 540. (In the PCIe system, it is not necessary always to provide a transaction response, for example in the case of a data write transaction where the address was already translated by the ATC 130).

The circuitry of FIG. 5 therefore operates such that when the translation circuitry has initiated handling of the data handling transaction by the downstream device, to receive a transaction response from the downstream device and to provide the transaction response to the upstream device via the transaction interface. In other words the downstream device is configured to communicate with the upstream device according to an interface protocol in which a response message is provided in response to every communication received from the upstream device. An example of such an interface protocol is the Advanced eXtensible Interface (AXI) protocol.

Figure 7:
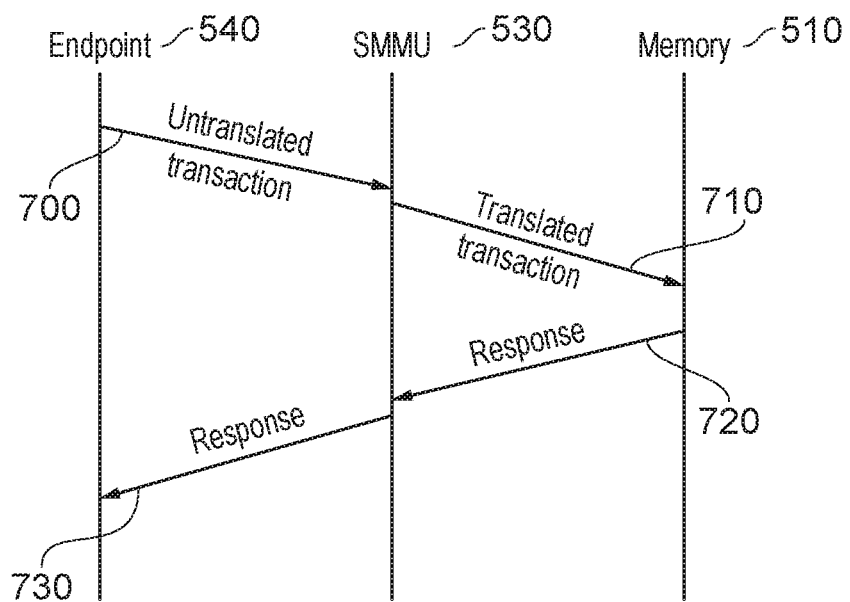
FIGS. 7 and 8 are schematic timing diagrams.

Referring to FIG. 7, in the situation where the VA to PA translation can be serviced by the SMMU 530 without fault, at a stage 700 the endpoint 540 transmits an untranslated transaction to the SMMU 530 (via the interface 542 to the interface 532). The SMMU 530 translates the transaction using the translation circuitry 534 into a transaction having a PA suitable for accessing the memory 510. The SMMU 530 provides the translated transaction via the output 536 at a stage 710 to the interconnect 500 and from there to the memory 510 for handling. The memory 510 provides a response at a stage 720. For example, in the case of a data read operation, the response may be the data itself, potentially accompanied by a completion acknowledgement. In the case of a data write operation, the response may be a completion acknowledgement. Finally in FIG. 7, at a stage 730, the SMMU 530 provides the response back to the endpoint via the interfaces 532, 542.

Consideration will now be given to the situation in which SMMU 530 is unable to service the translation from VA to PA required to implement the untranslated data handling transaction received from the upstream device. First, however, the nature of different types of translation error will be discussed with reference to FIG. 6.

Figure 6:
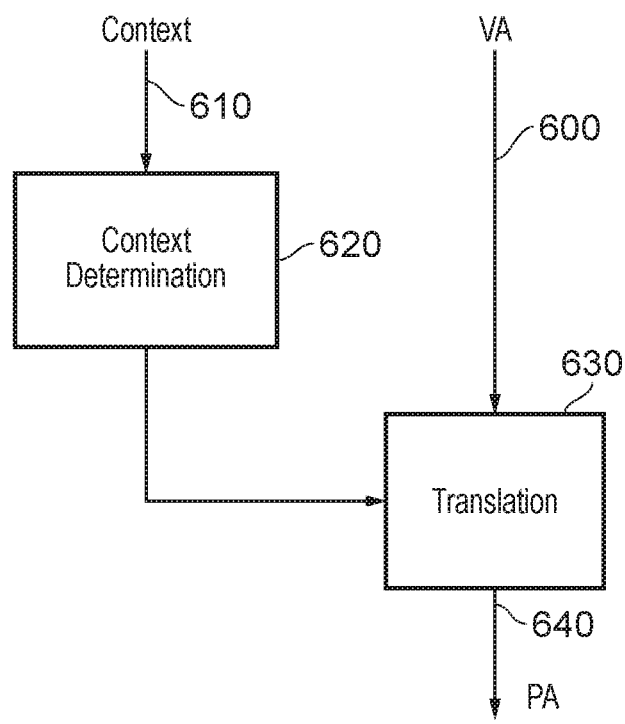
FIG. 6 is a schematic flowchart illustrating an address translation method.

FIG. 6 is a partial schematic flowchart illustrating some stages in the translation of a VA into a PA. An incoming VA for translation such as a VA 600 is accompanied by so-called context information 610 defining a context for that VA. This context could include a definition of an address space to which the VA relates, a definition of a process or thread to which the VA relates, a definition of a location in memory at which translation information such as page tables may be found, or the like.

An initial stage in the translation process is context determination (shown schematically in FIG. 6 as a step 620 in which the context is processed or parsed to determine parameters for use in the translation process (a step 630 in FIG. 6). For example, the context determination 620 may involve determining a pointer to the appropriate set of page tables for use in the translation step 630.

If the context determination step 620 fails, for example because of incorrect or faulty configuration of the SMMU 530, this is normally considered to be a fatal translation error which cannot be dealt with by a page request or similar reference to software such as an operating system.

If, however, the translation step 630 fails despite using a validly determined context, this is normally considered as a translation fault which could be dealt with by a page request or similar request to the operating system. For example, even though the devise operate under the AXI protocol, such a request may be a Page Request under the Peripheral Component Interconnect Express (PCIe) standard.

Note that the question of whether a fault occurs at the step 620 or the step 630 is not necessarily a definitive indication of whether the fault is considered fatal. For example, a fault occurring during the step 630 in which the memory system gives an error when attempting to read a page table entry would normally be considered fatal. The SMMU and/or the OS can apply a set of criteria such as predetermined criteria as to what type of fault constitutes a fatal error.

(Finally, as shown in FIG. 6, if both steps work correctly a PA 640 is output. This corresponds to the successful translation shown in FIG. 7.)

The situation will now be discussed in which the SMMU 530 cannot provide the translation of the VA forming part of an untranslated data handling transaction received from the upstream device. As discussed above, this could be because of a translation fault (which is potentially correctable by the operating system in response to a page request) or a fatal error such as a context determination error.

As discussed above, the SMMU 530 is configured to issue, and the endpoint 540 is configured to receive, a transaction response indicating either completion of the data handling transaction or a fault condition when translation of the target virtual memory address to a target physical memory address failed.

In response to such a failure notification, control circuitry 544 of the endpoint 540 is configured to issue a memory region request such as a page request to the downstream device (for example the SMMU 530), requesting that a memory region in the virtual memory address space including the target VA be made available.

In some examples, the transaction interface 542 is configured to receive as the transaction response from the SMMU 530 indicating a fault condition either:

a translation fault indication, indicating that a memory region request may be attempted by the upstream device; or a fatal error indication, indicating that a memory region request should not be attempted by the upstream device.

In dependence upon the nature of the translation failure, the control circuitry 544 of the endpoint can select whether or not to issue the memory region request. In particular, the control circuitry 544 can be configured to issue the memory region request to the downstream device in response to receipt by the transaction interface of a translation fault indication. To achieve this, when the set of address mappings fails to provide an address mapping for the target VA, the translation circuitry 534 is configured to provide as the transaction response either a translation fault indication, indicating that a memory region request may be attempted by the upstream device or a fatal error indication, indicating that a memory region request should not be attempted by the upstream device. The control circuitry 544 of the endpoint 540 can issue, or not issue, the region request in dependence on that indication. So, if the fault is for example a fatal fault such as a failure to determine a context (se FIG. 6 as discussed above) such that there is no point or little point issuing a region or page request, the control circuitry 544 of the endpoint 540 can elect not to issue such a request and instead to handle the situation as a fault condition. If however the fault is one which is at least potentially resolvable by a region or page request, then the endpoint 540 can elect to issue such a request.

Note however that the distinction between fatal faults and translation faults is not merely one of optimisation in that it is not necessary to issue a page request when the fault is fatal. The distinction is more significant than that. A translation fault in the present context is one where the fault occurred because of reasons that are known to software and/or resolvable by software, and where it is expected that the transaction will be (or at least can usefully be) retried once any faults are resolved. In contrast, a fatal fault is not expected to lead to transaction retry. If a translation fault was to be used in place of a fatal fault then the transaction would be repeatedly retried because software would always give a successful response to a page request.

This arrangement therefore represents an example of the situation, when the set of address mappings fails to provide an address mapping for the target virtual memory address, in which translation circuitry is configured to provide as a transaction response either a translation fault indication, indicating that a memory region request may be attempted by the upstream device or a fatal error indication, indicating that a memory region request should not be attempted by the upstream device.

Memory region or page requests are communicated from the endpoint 540 to the SMMU 530 (and memory region request responses in the opposite direction) via a memory region or page request interface 546 at the endpoint 540 and a memory region or page request interface 538 at the SMMU. These interfaces are separate to the transaction interfaces 532, 542 in the example embodiment as shown, but it is noted that they could in fact be the same interface in other examples.

At the SMMU 530, control circuitry 539 is configured to receive a memory region request from the upstream device such as the endpoint 540, requesting that a memory region in the virtual memory address space including the target VA be made available, to initiate handling of the memory region request by the OS (for example, by issuing a processor interrupt to the CPU 520 and providing a page or region request event to an OS being executed by the CPU 520) and to provide a response to the upstream device in dependence upon the handling of the memory region request by the OS.

The resolution or outcome of the memory region or page request, as provided by the OS, may be such that the requested region or page is now available (the "yes" outcome of the step 240) and that the data handling transaction may be reissued or that the data handling transaction should not be reissued (for example it is still not available (the "no" outcome of the step 240)). At the endpoint 540, the control circuitry 544 is configured to selectively reissue the data handling transaction in dependence upon the memory region request response received from the downstream device.

Figure 8:
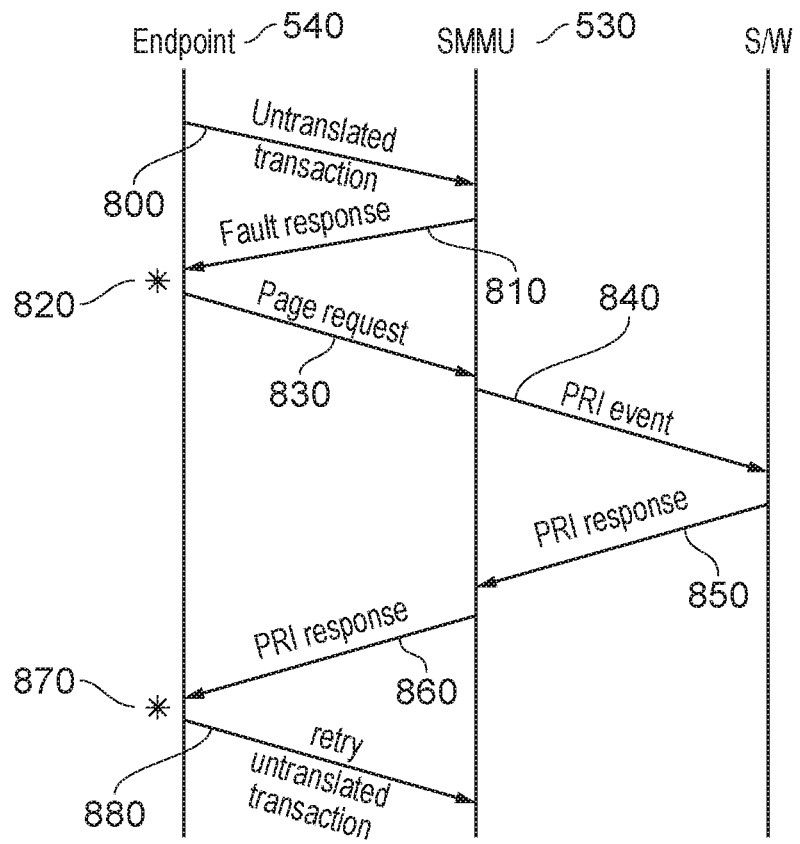

A timing diagram relating to this process is provided schematically as FIG. 8. The process starts with the endpoint 540 issuing an untranslated data handling transaction defining a target VA (relating to the address of a read, write, invalidate or other operation) at a stage 800. The transaction is routed to the SMMU 530 which attempts to translate the target VA into a target PA, but in the situation of FIG. 8, the translation fails and a fault response is returned by the SMMU 530 to the endpoint 540 at a stage 810.

In response, at a stage represented by an asterisk 820, the control circuitry 544 of the endpoint 540 elects whether or not to issue a page (region) request to request software such as an OS to make the required memory region or page available. This choice is in response to the nature of the fault response provided at the stage 810, which can be either a translation fault indication, indicating that a memory region request may be attempted by the upstream device or a fatal error indication, indicating that a memory region request should not be attempted by the upstream device. In the case of a fatal error indication the control circuitry 544 does not issue a memory region (page) request and enters a fault condition instead. However, in the case of a translation fault indication, the control circuitry 544 does issue a page request at a stage 830, via the interfaces 546, 538. The page request is received by the SMMU 530 and causes the SMMU 530 to issue a PRI event to software such as the OS at a stage 840. The OS eventually replies with a PRI response at a stage 850 which triggers or instructs the SMMU 530 to provide a PRI response to the endpoint 540 at a stage 860.

Therefore, at the stages 840, 850 the control circuitry 539 is configured to forward the memory region request to an operating system which controls configuration of the translation circuitry, and to forward to the upstream device a response received from the operating system. At the stage 840 the control circuitry may be configured to issue a processor interrupt to initiate handling of the memory region request by the operating system.

The PRI response can be positive (yes the page is now available) or negative. In the case of a negative response, as detected at a stage 870 indicated by an asterisk, the endpoint 540 enters a fault condition. In the case of a positive response, the endpoint 540 retries the untranslated data handling transaction at a stage 880 which then leads to processing corresponding to the stage 700 onwards in FIG. 7.

Figure 9:
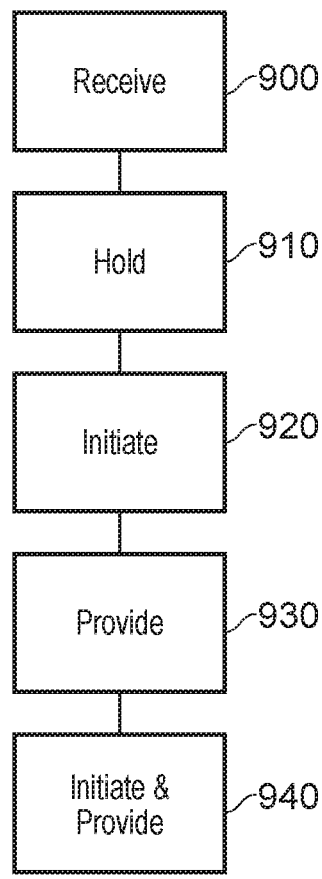
FIGS. 9 and 10 are schematic flowcharts illustrating respective methods.

In summary, FIG. 9 is a schematic flowchart illustrating a method comprising receiving (at a step 900) a data handling transaction from an upstream device, the data handling transaction defining a target virtual memory address in a virtual memory address space;

accessing (at a step 910) a set of address mappings between virtual memory addresses and physical memory addresses in a physical memory address space;

initiating (at a step 920) handling of the data handling transaction by a downstream device according to a target physical memory address mapped from the target virtual memory address when the set of address mappings accessed by the accessing step includes an address mapping for the target virtual memory address;

providing (at a step 930) a transaction response indicating a fault condition when the set of address mappings accessed by the accessing step fails to provide an address mapping for the target virtual memory address; and (at a step 940) in response to receipt of a memory region request from the upstream device, requesting that a memory region in the virtual memory address space including the target virtual memory address be made available, initiating handling of the memory region request and providing a response in dependence upon the handling of the memory region request.

Figure 10:
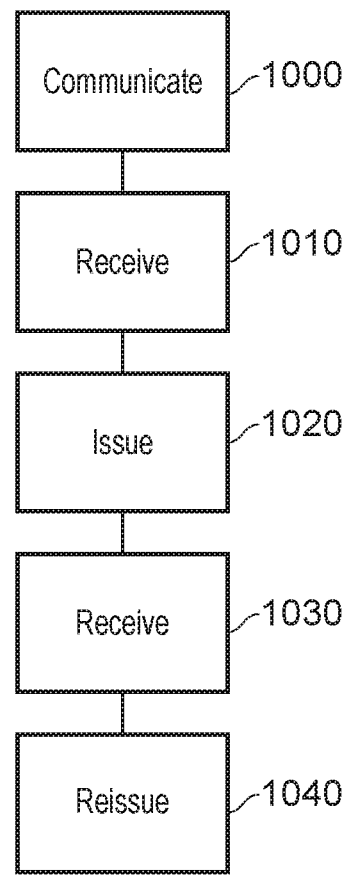

FIG. 10 is a further schematic summary flowchart illustrating a method comprising:

communicating (at a step 1000) a data handling transaction to a downstream device, the data handling transaction defining a target virtual memory address in a virtual memory address space;

receiving (at a step 1010) a transaction response indicating either completion of the data handling transaction or a fault condition when translation of the target virtual memory address to a target physical memory address failed;

issuing (at a step 1020) a memory region request to the downstream device, requesting that a memory region in the virtual memory address space including the target virtual memory address be made available;

receiving (at a step 1030) a memory region request response from the downstream device; and selectively reissuing (at a step 1040) the data handling transaction in dependence upon the memory region request response received from the downstream device.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Circuitry comprising:
   memory management circuitry disposed between an upstream device and a downstream device, the memory management circuitry comprising:
   a transaction interface to receive a data handling transaction from the upstream device, the data handling transaction defining a target virtual memory address in a virtual memory address space;
   translation circuitry to access a set of address mappings between virtual memory addresses and physical memory addresses in a physical memory address space;
   the translation circuitry being configured to initiate handling of the data handling transaction by the downstream device according to a target physical memory address mapped from the target virtual memory address when the set of address mappings includes an address mapping for the target virtual memory address, and to provide a transaction response to the transaction interface indicating a fault condition when the set of address mappings fails to provide an address mapping for the target virtual memory address; and
   control circuitry to receive a memory region request from the upstream device via a memory region request interface, separate from the transaction interface, requesting that a memory region in the virtual memory address space including the target virtual memory address be made available, to initiate handling of the memory region request and to provide a response to the upstream device in dependence upon the handling of the memory region request, in which the control circuitry is configured to forward the memory region request to an operating system which controls configuration of the translation circuitry, and to forward to the upstream device a response received from the operating system.

2. Circuitry according to claim 1, in which, when the set of address mappings fails to provide an address mapping for the target virtual memory address, the translation circuitry is configured to provide as the transaction response either a translation fault indication, indicating that a memory region request may be attempted by the upstream device or a fatal error indication, indicating that a memory region request should not be attempted by the upstream device.

3. Circuitry according to claim 1, in which the response from the operating system indicates either that the memory region is available and the data handling transaction may be reissued or that the data handling transaction should not be reissued.

4. Circuitry according to claim 1, in which the control circuitry is configured to issue a processor interrupt to initiate handling of the memory region request by the operating system.

5. Circuitry according to claim 1, the circuitry being configured, when the translation circuitry has initiated handling of the data handling transaction by the downstream device, to receive a transaction response from the downstream device and to provide the transaction response to the upstream device via the transaction interface.

6. Circuitry according to claim 1, in which the memory region request is a Page Request under the Peripheral Component Interconnect Express (PCIe) standard.

7. Circuitry according to claim 1, in which the circuitry is configured to communicate with the upstream device according to an interface protocol in which a response message is provided in response to every communication received from the upstream device.

8. Circuitry according to claim 7, in which the interface protocol is the Advanced eXtensible Interface (AXI) protocol.

9. Circuitry comprising:
   a downstream device;
   a transaction interface to communicate a data handling transaction to a downstream device, the data handling transaction defining a target virtual memory address in a virtual memory address space, and to receive a transaction response indicating either completion of the data handling transaction or a fault condition when translation of the target virtual memory address to a target physical memory address failed; and
   control circuitry to issue a memory region request to the downstream device via a memory region request interface, separate from the transaction interface, requesting that a memory region in the virtual memory address space including the target virtual memory address be made available, and to receive a memory region request response from the downstream device;
   the control circuitry being configured to selectively reissue the data handling transaction in dependence upon the memory region request response received from the downstream device;
   in which the downstream device is an address translation device configured to translate the target virtual memory address to the target physical memory address in a physical memory address space, and to initiate handling of the data handling transaction in dependence upon the target physical memory address; and
   in which the circuitry is configured to communicate with the downstream device according to an interface protocol in which a response message is provided by the downstream device in response to every communication issued by the circuitry to the downstream device.

10. Circuitry according to claim 9, in which:
    the transaction interface is configured to receive as the transaction response indicating a fault condition either a translation fault indication, indicating that a memory region request may be attempted by the upstream device or a fatal error indication, indicating that a memory region request should not be attempted by the upstream device; and
    the control circuitry is configured to issue the memory region request to the downstream device in response to receipt by the transaction interface of a translation fault indication.

11. Circuitry according to claim 9, in which the memory region response from the downstream device comprises either an indication that the memory region is available and the data handling transaction may be reissued or an indication that the data handling transaction should not be reissued.

12. Circuitry according to claim 9, in which the control circuitry is configured to issue a notification to the downstream device that the circuitry does not comprise a translation cache memory.

13. Circuitry according to claim 9, in which the downstream device comprises:
    translation circuitry to access a set of address mappings between virtual memory addresses and physical memory addresses in a physical memory address space;
    the translation circuitry being configured to initiate handling of the data handling transaction according to the target physical memory address mapped to the target virtual memory address when the set of address mappings includes an address mapping for the target virtual memory address, and to provide the transaction response to the transaction interface indicating a translation error when the set of address mappings fails to provide an address mapping for the target virtual memory address.

14. Circuitry according to claim 13, in which the downstream device comprises:
    control circuitry to receive the memory region request from the upstream device, requesting that the memory region in the virtual memory address space including the target virtual memory address be made available, to initiate handling of the memory region request and to provide the memory region request response to the upstream device in dependence upon the handling of the memory region request.

15. A method comprising
    receiving a data handling transaction from an upstream device via a transaction interface, the data handling transaction defining a target virtual memory address in a virtual memory address space;
    accessing a set of address mappings between virtual memory addresses and physical memory addresses in a physical memory address space;
    initiating handling of the data handling transaction by a downstream device according to a target physical memory address mapped from the target virtual memory address when the set of address mappings accessed by the accessing step includes an address mapping for the target virtual memory address;
    providing a transaction response indicating a fault condition when the set of address mappings accessed by the accessing step fails to provide an address mapping for the target virtual memory address; and
    in response to receipt of a memory region request from the upstream device via a memory region request interface, separate from the transaction interface, requesting that a memory region in the virtual memory address space including the target virtual memory address be made available, initiating handling of the memory region request and providing a response in dependence upon the handling of the memory region request;
    in which the initiating handling of the memory region request comprises forwarding the memory region request to an operating system which controls configuration of the translation circuitry, and forwarding to the upstream device a response received from the operating system.

16. A method comprising:

communicating a data handling transaction to a downstream device via a transaction interface, the data handling transaction defining a target virtual memory address in a virtual memory address space;

receiving a transaction response indicating either completion of the data handling transaction or a fault condition when translation of the target virtual memory address to a target physical memory address failed;

issuing a memory region request to the downstream device via a memory region request interface, separate from the transaction interface, requesting that a memory region in the virtual memory address space including the target virtual memory address be made available;

receiving a memory region request response from the downstream device; and selectively reissuing the data handling transaction in dependence upon the memory region request response received from the downstream device;

in which the communicating step comprises communicating according to an interface protocol in which a response message is provided by the downstream device in response to every communication issued by the circuitry to the downstream device; the method comprising:

the downstream device translating the target virtual memory address to the target physical memory address in a physical memory address space, and initiating handling of the data handling transaction in dependence upon the target physical memory address.

* * * * *